US012184792B1

(12) United States Patent
Stapleton

(10) Patent No.: US 12,184,792 B1
(45) Date of Patent: Dec. 31, 2024

(54) SYSTEMS AND METHODS FOR MANAGING KEYS OF DIGITAL CERTIFICATES

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 218 days.

(21) Appl. No.: 18/062,535

(22) Filed: Dec. 6, 2022

(51) Int. Cl.
*H04L 9/32* (2006.01)
*H04L 9/14* (2006.01)
*H04L 9/30* (2006.01)

(52) U.S. Cl.
CPC .............. *H04L 9/3263* (2013.01); *H04L 9/14* (2013.01); *H04L 9/30* (2013.01); *H04L 9/3247* (2013.01)

(58) Field of Classification Search
CPC . H04L 9/0825; H04L 9/14; H04L 9/30; H04L 9/3263–3268; H04L 63/06; H04L 63/0823
See application file for complete search history.

(56) References Cited

U.S. PATENT DOCUMENTS

| 8,340,298 | B2 | 12/2012 | Gelfond et al. | |
|---|---|---|---|---|
| 8,897,449 | B1 | 11/2014 | Broadbent | |
| 9,660,978 | B1 * | 5/2017 | Truskovsky | ........ H04L 63/0823 |
| 10,425,401 | B1 * | 9/2019 | Pecen | ................. H04L 63/0815 |
| 2020/0280436 | A1 | 9/2020 | Nix | |
| 2023/0344647 | A1 * | 10/2023 | Jackson | ..................... H04L 9/14 |

OTHER PUBLICATIONS

Panos Kampanakis, Peter Panburana, Ellie Daw and Daniel Van Geest, The Viability of Post-Quantum X.509 Certificates, Jan. 11, 2018.
Nina Bindel, Johannes Braun, Luca Gladiator, Tobias Stockert and Johannes Wirth, X.509—Compliant Hybrid Certificates for the Post-Quantum Transition, Journal of Open Source Software, 4(40), 1606, Aug. 12, 2019.

\* cited by examiner

*Primary Examiner* — Kevin Bechtel
(74) *Attorney, Agent, or Firm* — K&L Gates LLP

(57) ABSTRACT

Systems, apparatuses, methods, and computer program products are disclosed for managing keys of digital certificates. An example method includes receiving a digital certificate comprising a first public key and a corresponding first digital signature and a second public key and a corresponding second digital signature. The example method also includes receiving a signed data object associated with the digital certificate. The signed data object indicates a set of key management policies associated with the first public key and the second public key. The example method further includes performing, based on the set of key management policies, a first cryptographic data protection action using the first public key and the first digital signature or the second public key and the second digital signature. The first cryptographic data protection action facilitates secure communication between the first device and the second device.

19 Claims, 9 Drawing Sheets

SYSTEMS AND METHODS FOR MANAGING KEYS OF DIGITAL CERTIFICATES

BACKGROUND

Digital certificates may be used to validate the identity of communicating devices using cryptographic public keys to ensure security and reliability of communications between the communicating devices. The digital certificates may be issued by various entities and may include different public keys. Multiple digital certificates may be used establish a chain of certificates that allows for trust between the communicating devices to be verified.

BRIEF SUMMARY

Digital certificates may include cryptographic public keys of public-private key pairs, an identity of an owner, and a digital signature. The certificate may be issued by a certificate authority (CA) responsible for issuing the digital certificate to the owner of the public-private key pair.

Some digital certificates may include multiple public keys and multiple digital signatures corresponding to the respective public keys. For instance, an X.509 certificate may comprise a first (or "native") public key and a corresponding digital signature as well as a second (or "alternative") public key and a corresponding digital signature. However, the certificate may not include information regarding under what conditions each of the public keys in the certificate is to be used. Consequently, there may be ambiguity between when and how public keys and signatures of certificates are to be used to secure communications.

Systems, apparatuses, methods, and computer program products are disclosed herein for managing use of keys in digital certificates. Embodiments described herein may provide for a method of resolving the ambiguity aforementioned, within the digital certificates. To do so, a signed data object may be utilized. The signed data object may include information usable to resolve the ambiguity in the digital certificates. For instance, the signed data object may specify which public key and corresponding digital signature is to be used (e.g., based on capabilities of one or more of the devices needing to communicate via the digital certificate). Once resolved, secure communication of sensitive data may be facilitated between all devices. In this regard, the signed data objects may allow for two devices to use the public keys from digital certificates in a consistent manner to secure communications or perform other types of cryptographic operations.

In example embodiments, methods are provided that facilitate rolling-forward from legacy to post-quantum cryptography (PQC) algorithms and rolling-backward from PQC algorithms to legacy algorithms through use of the signed data object. The signed data object may indicate when keys (and corresponding digital signatures) of a digital certificate associated with PQC are to be used and when keys (and corresponding digital signatures) of the digital certificate associated with legacy encryption are to be used. By doing so, both keys and corresponding digital signatures of digital certificates may be managed in a cooperative manner through enforcement of similar key management practices defined by the signed data object. For example, use of the signed data object may facilitate pre-processing activities such as certificate installation, real-time processing within a security protocol, as well as post-processing such as an audit or incident investigation in coordinated manners.

In example embodiments, an apparatus is provided for the utilization of a computer-implemented method of key management in digital certificates. The apparatus may be a system that includes one or more computing devices, operably connected to one another by a communication network. Any of the computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

The computer-implemented method of key management in digital certificates may include obtaining, by a first computing device, a first signed data object collected from an object distribution process; and obtaining, by the first computing device, one or more digital certificates collected from a digital certificate distribution process. The computer-implemented method may also include obtaining, by a second computing device, a second signed data object collected from the object distribution process; and obtaining, by the second computing device, one or more digital certificates collected from the digital certificate distribution process. The first computing device and second computing device may utilize the first signed data object and the second signed data object, respectively, for the management of public keys in the digital certificates that may be obtained by either the first computing device and/or the second computing device, allowing for uninterrupted usage of keys by the first computing device and/or second computing device to establish and maintain secure communications.

In some embodiments, a method for secure communication is provided. The method includes receiving, receiving, by communications hardware of a first device, a digital certificate comprising a first public key and a corresponding first digital signature and a second public key and a corresponding second digital signature. The method also includes receiving, by the communications hardware of the first device, a signed data object that indicates a set of key management policies associated with the first public key and the second public key. The method also includes performing, by data protection circuitry of the first device and based on the set of key management policies, a first cryptographic data protection action using the first public key and the first digital signature or the second public key and the second digital signature, the first cryptographic data protection action facilitating secure communication between the first device and a second device.

In some embodiments, an apparatus for secure communication is provided. The apparatus comprises a first device and includes communications hardware configured to receive a digital certificate comprising a first public key and a corresponding first digital signature and a second public key and a corresponding second digital signature. The communications hardware is also configured to receive a signed data object associated with the digital certificate wherein the signed data object indicates a set of key management policies for the first public key and the second public key. The apparatus also includes data protection circuitry configured to perform, based on the set of key management policies, a first cryptographic data protection action using the first public key and the first digital signature or the second public key and the second digital signature, wherein the first cryptographic data protection action facilitates secure communication between the first device and a second device.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
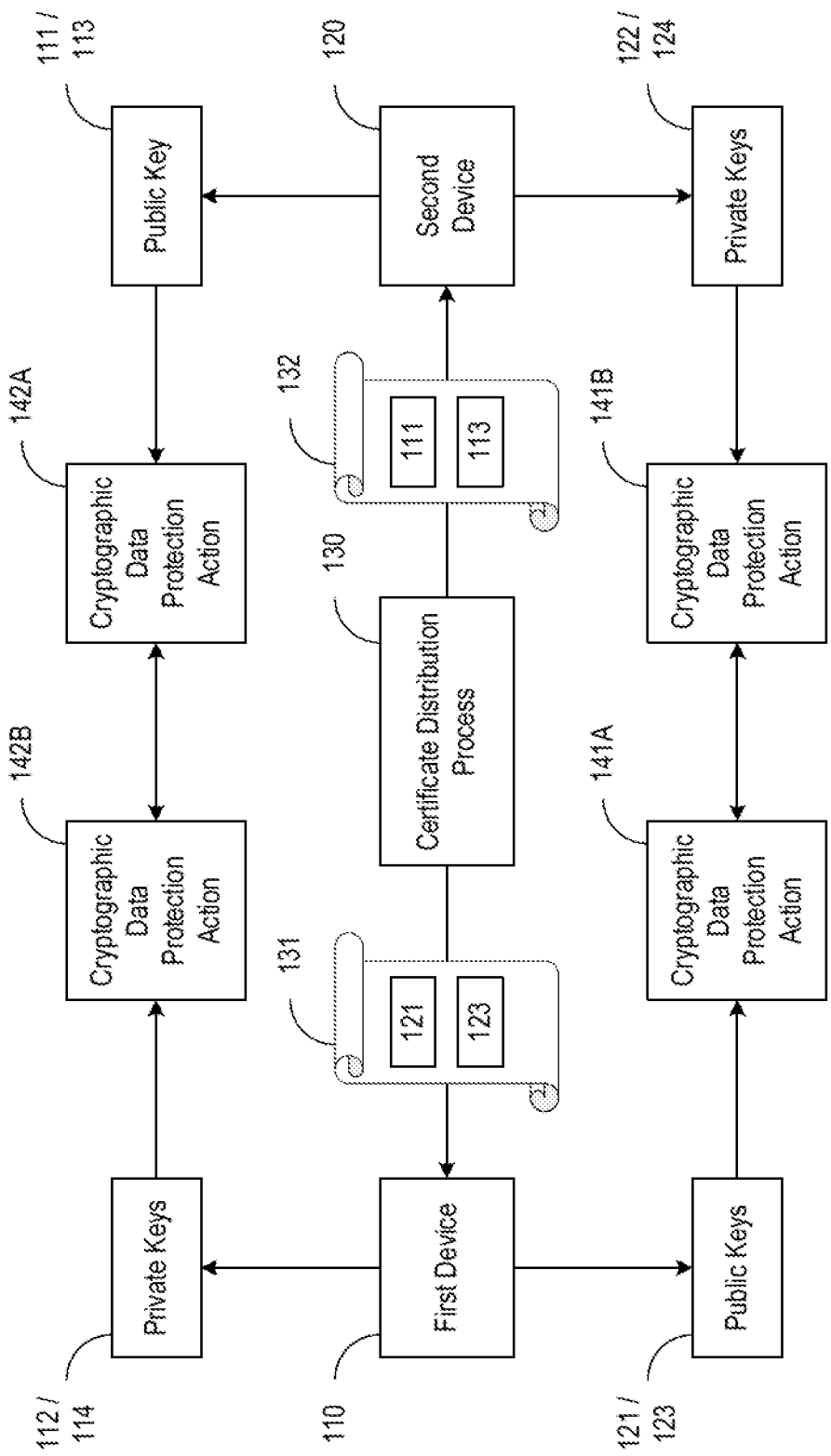
FIG. 1 illustrates a method of establishing and maintaining secure communication between example devices.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

As noted above, methods, apparatuses, systems, and computer program products are described herein that provide for managing keys used in digital certificates. Traditionally, it has been very burdensome (both computationally and physically) to maintain secure communications between multiple parties (e.g., devices, systems, or the like). Digital certificates may be used to facilitate secure communications, but may require oversight in their use. For example, digital certificates may only be useful during certain periods of time and different digital certificates may need to be used over time.

To facilitate flexibility in use of digital certificates and over longer periods of time, digital certificates may include multiple keys which may be usable to address different potential security scenarios. For example, some of the public keys of a digital certificate may only be usable for a specific range of purposes, while other public keys of the digital certificates may only be usable for other purposes. In the context of convention and PQC encryption, some of the public keys of a digital certificate may be usable by devices that are able to perform PQC encryption while other public keys of the digital certificate may be usable by other devices that are not able to perform PQC. The public keys of a digital certificate may be differentiated from each other for other reasons without departing from embodiments disclosed herein.

However, because the digital certificates do not explicitly indicate when and how the public keys and corresponding signatures of the digital certificates are to be used, use of the public keys may be ambiguous to the entities that possess and may wish to utilize the digital certificates. Accordingly, two entities having access to the same digital certificate may not be able to effectively use the public keys therein. For instance, when a first digital certificate contains two public keys, e.g., a first public key and a second public key, the first public key may be needed to verify a first digital signature of a second digital certificate or the second public key may be needed to verify a second digital signature of the second digital certificate, depending on whether a device associated with the second digital certificate has migrated to support alternative security architectures (e.g., PQC algorithms and digital signatures) or not. In this regard, the first public key may be needed to verify the first digital signature of the second digital certificate in an instance in which the party has not migrated to support the alternative (e.g., PQC) security architecture, and the second public key may be needed to verify the second digital signature of the second digital certificate in an instance in which the party has migrated to support the alternative security architecture.

To address the ambiguity in digital certificates, embodiments disclosed herein may provide for the generation, distribution, and use of signed objects in conjunction with digital certificates. The signed objects may resolve ambiguity with respect to various keys and corresponding digital signatures in the digital certificates thereby facilitating cooperative use of the digital certificates. In some embodiments, a signed object may comprise a Cryptographic Message Syntax (CMS)-based data object, such as a SignedData object or SigncryptedData object. In some embodiments, a signed object may comprise an X.509 Attribute Certificate (AC) object with extensions. AC objects may contain attributes that specify certain information, such as group membership, security clearance, and/or other authorization information associated with an AC holder.

In some embodiments, for example in the context of an operational event in which a key is expired, or in the context of a security event in which a key pair is compromised, the signed object may indicate when to switch between use of multiple public keys in a digital certificate (e.g., to stop use of the compromised key pair). Thus, the signed object may facilitate rolling-forward, rolling-backward, and/or other methods of coordinated use of multiple public keys in digital certificates.

In the context of legacy and PQC cryptography, the signed object may facilitate selective use of public keys (and corresponding digital signatures) in digital certificates depending on whether all of the actors in a communication scenario do or do not include PQC cryptography functionality.

Turning to FIG. 1, a diagram illustrating a method of establishing and maintaining secure communication between example devices 110 and 120 (e.g., computing devices). The secure communication may be established using asymmetric keys (e.g., public keys 111 and 121, and private keys 112 and 122). As shown, a first device 110 (e.g., Alice) receives or otherwise obtains a digital certificate 131 via a certificate distribution process 130. The second device 120 (e.g., Bob) also receives or otherwise obtains a digital certificate 132 via the certificate distribution process 130. The certificate distribution process may be a process or system (e.g., one or more computing devices, servers, etc.) that may be used to distribute digital certificates to devices. For example, certificate distribution process 130 may include a certificate authority (CA) that issues digital certificates which may be used to verify the identity of users and/or devices. The digital certificate 131 includes a public key 121 and another public key 123. The public key 121 may be part of a public/private key pair that includes private key 122. The public key 123 may be part of a public/private key pair that includes private key 124. The private keys 122 and 124 may be known only to the second device 120. The digital certificate 132 includes a public key 111 and another public key 113. The public key 111 may be part of a public/private key pair that includes private key 112. The public key 113 may be part of a public/private key pair that includes private key 114. The private keys 112 and 114 may be known only to the first device 110.

Once digital certificates 131 and 132 are distributed, the first device 110 has public keys 121 and 123, and the second device 120 has public keys 111 and 113 which can be used to perform cryptographic data protection actions (e.g., cryptographic data protection actions 141A, 141A, 142A, and 142B). For instance, an example cryptographic data protection action 141A performed by the first device 110 may be encrypting data using the public key 121 and an example cryptographic data protection action 141B performed by the second device 120 may be decrypting the encrypted data using the private key 122 after receiving the encrypted data from the first device 110. In another instance, an example cryptographic data protection action 142A performed by the second device 120 may be encrypting data using the public key 111 and an example cryptographic data protection action 142B performed by the first device 110 may be decrypting the encrypted data using the private key 112 after receiving the encrypted data from the second device 120. Another example cryptographic data protection action 141A may include the first device 110 encrypting a symmetric key with the public key 121 and encrypting data with the symmetric key, and the second device (having received the encrypted data and encrypted symmetric key) performing an example cryptographic data protection action 141B in which the second device decrypts the symmetric key with the private key 122 and subsequently decrypts the data with the symmetric key. In some embodiments, the symmetric key may also be used for generating a message authentication code (e.g., a hash-based message authentication code (HMAC) or the like). Another example cryptographic data protection action 142B may include the first device signing data with private key 112 and an example cryptographic data protection action 142B in which the second device verifies the signature with public key 111.

As illustrated in FIG. 1, a certificate may include multiple public keys (and multiple digital signatures which may be verified using a corresponding public key). For example, digital certificate 131 includes public keys 121 and 123, and digital certificate 132 includes public keys 111 and 113. Public keys 111 and 121 may be referred to as primary public keys (e.g., primary keys). Public keys 113 and 123 may be referred to as alternate public keys (e.g., alternate keys). The public keys 111 and 113 may be different types of public keys. For example, both public keys 111 and 113 may be non-PQC keys (e.g., keys that are not generated using quantum-based methods, mechanisms, systems, etc.). In another example, both public keys 111 and 113 may be PQC keys (e.g., keys that are generated using quantum-based methods, mechanisms, systems, etc., such as quantum entanglement). In a further example, public key 111 may be a non-PQC based key and public key 113 may be a PQC key, or vice versa.

In order to determine which of the public keys 111, 113, 121, and 123 (and correspondingly which of the private keys 112, 114, 122, and 124) should be used, the first device 110 and the second device 120 may need to coordinate with each other to manage the usage of the public keys. For example, the first device 110 and the second device may need to coordinate which public keys should be used (e.g., to verify a digital signature), when the public keys should be used, and which applications, protocols, etc., should use the public keys. Manually coordinating the usage of the keys between the first device 110 and the second device 120 may be a time consuming and complex process. For example, one of the public keys in a digital certificate may be a PQC key that is not supported by a particular computing device (which may only support legacy or non-PQC based keys). In another example, errors may occur while using a particular key of the digital certificate. Although a digital certificate may include multiple keys for devices to use, the coordination of how, when, and/or whether to use the keys is performed out-of-band between the devices. This results in a more complicated, more time-consuming management process that is difficult to perform, especially as the number of keys and/or digital certificates increases.

Utilizing a signed data object that may include information (e.g., metadata) that may provide instructions about which public keys should be used (e.g., to verify a particular digital signature), when the public keys should be used, and which applications, protocols, etc., should use the public keys, provides for an improved method of establishing secure communication between devices (as further described below in connection with FIG. 2). The signed data object may facilitate rolling between various public keys in a coordinated manner (e.g., roll-forward approach and roll-backward approaches between legacy keys and PQC keys, or between multiple legacy keys). The signed data object may also allow for pre-processing such as certificate installation, real-time processing within a security protocol, or post-processing such as an audit or incident investigation, which may allow the metadata to adapt instructions about which public keys should be used, when the public keys should be used, and which applications, protocols, etc., should use the public keys.

Figure 2:
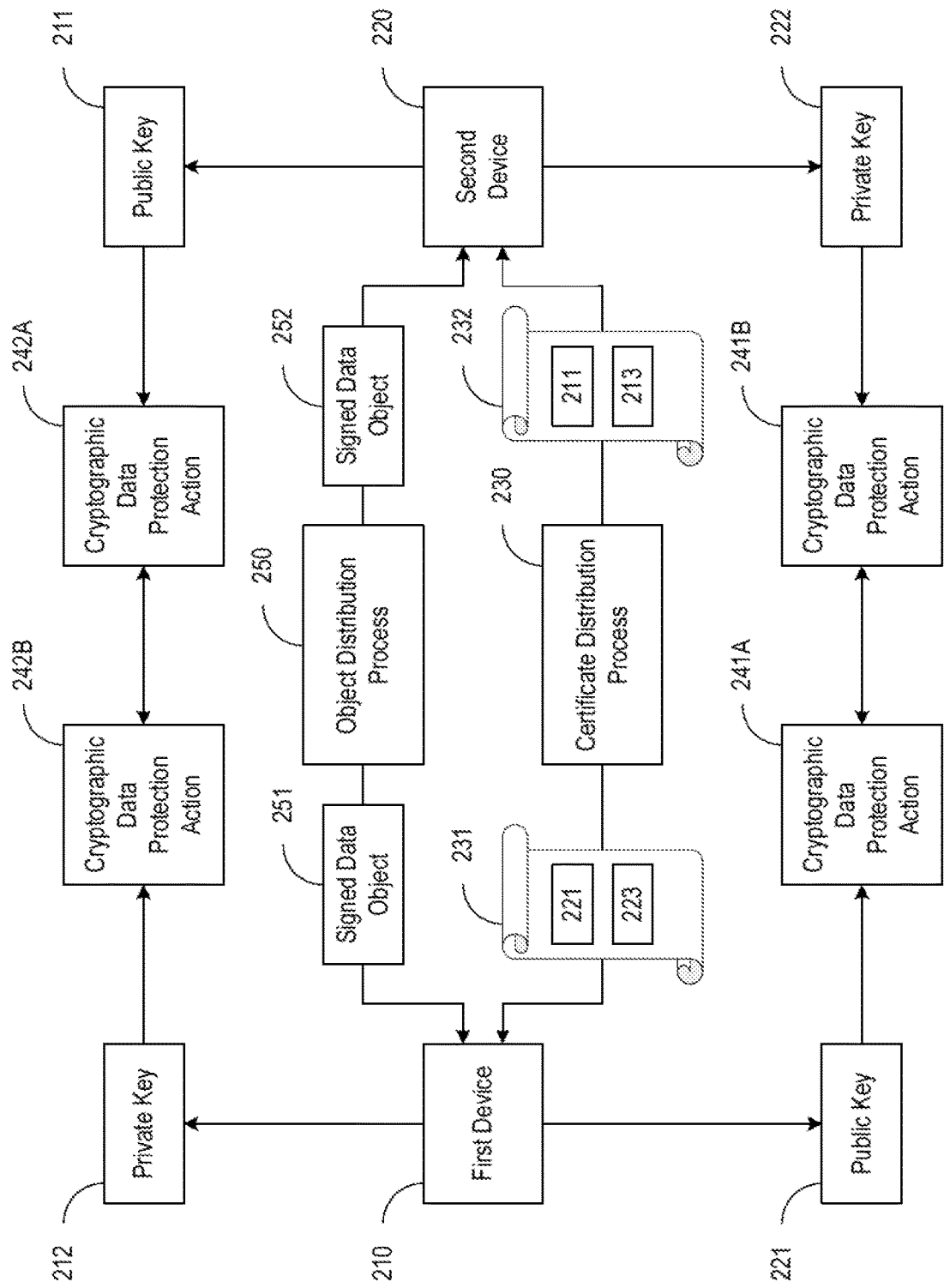
FIG. 2 illustrates an improved method of establishing and maintaining secure communication between example devices in accordance with some example embodiments described herein.

FIG. 2 illustrates an improved method of establishing and maintaining secure communication between example devices 210 and 220 in accordance with some example embodiments described herein. The secure communication may be established using asymmetric keys (e.g., public keys 211 and 221, and private keys 222 and 212). As shown, a first device 210 (e.g., Alice) receives or otherwise obtains a digital certificate 231 via a certificate distribution process 230. The second device 220 (e.g., Bob) also receives or otherwise obtains a digital certificate 232 via the certificate distribution process 230. The certificate distribution process may be a process or system (e.g., one or more computing devices, servers, etc.) that may be used to distribute certificates to devices. For example, certificate distribution process 230 may include a certificate authority (CA) that issues digital certificates which may be used to verify the identity of users and/or devices. The digital certificate 231 includes a public key 221 and another public key 223. The public key 221 may be part of a public/private key pair that includes private key 222. The public key 223 may be part of a public/private key pair that includes private key 224. The private keys 222 and 224 may be known only to the second device 220. The digital certificate 232 includes a public key 211 and another public key 223. The public key 211 may be part of a public/private key pair that includes private key 212. The public key 213 may be part of a public/private key pair that includes private key 214. These private keys 212 and 214 may be known only to the first device 210.

Once digital certificates 231 and 232 are distributed, the first device 210 has public keys 221 and 223, and the second device 220 has public keys 211 and 223, which can be used to perform cryptographic data protection actions (e.g., cryptographic data protection actions 241A, 241A, 242A, and 242B). Various cryptographic data protection actions may be performed (e.g., similar to the various cryptographic data protection actions described above in connection with FIG. 1). For instance, an example cryptographic data protection action 241A performed by the first device 210 may be encrypting data using the public key 221 and an example cryptographic data protection action 241B performed by the second device 220 may be decrypting the encrypted data using the private key 222 after receiving the encrypted data from the first device 210. In another instance, an example cryptographic data protection action 242A performed by the second device 220 may be encrypting data using the public key 211 and an example cryptographic data protection action 242B performed by the first device 210 may be decrypting the encrypted data using the private key 212 after receiving the encrypted data from the second device 220.

As illustrated in FIG. 2, a certificate may include multiple public keys. For example, digital certificate 231 includes public keys 221 and 223, and digital certificate 232 includes public keys 211 and 213. Public keys 211 and 221 may be referred to as primary public keys (e.g., primary keys). Public keys 213 and 223 may be referred to as alternate public keys (e.g., alternate keys). The public keys 211 and 213 may be the same or different types of public keys. For example, both public keys 211 and 213 may be non-PQC keys (e.g., keys that are not generated using quantum-based methods, mechanisms, systems, etc.). In another example, both public keys 211 and 213 may be PQC keys (e.g., keys that are generated using quantum-based methods, mechanisms, systems, etc., such as quantum entanglement). In a further example, public key 211 may be a non-PQC based key and public key 213 may be a quantum-based key, or vice versa. Similarly, the public keys 221 and 223 may be a combination of non-PQC based keys and PQC keys.

In one embodiment, an object distribution process may generate and/or provide a signed data object 251 to the first device 210 and a signed data object 252 to the second device 220. In one embodiment, the signed data object 251 may be signed by the second device 220 (e.g., may have a digital signature associated with the second device 220). This may allow the first device 210 to verify or confirm that the signed data object 251 is from the second device 220 or has been approved by the second device 220. The signed data object 252 may be signed by the first device 210 or may have a digital signature associated with the first device 210. This may allow the second device 220 to verify or confirm that the signed data object 252 is from the first device 210 or has been approved by the first device 210. In another embodiment, the signed data object 251 may be signed by a third-party device (not illustrated in FIG. 2). For example, the signed data object 251 may be signed by a third device/party that is trusted by the devices 210 and 220. In a further example, the signed data object 251 may be a digital certificate that is provided by a certificate authority.

In one embodiment, the signed data object 251 may include a set of policies (e.g., one or more rules, parameters, procedures, etc. that may be referred to as key management policies) for the public keys 221 and 223 (that are included in the digital certificate 231). The set of policies may indicate one or more periods of times when the public keys 221 and 223 should be used (e.g., when the public keys 221 and 223 are valid). The set of policies may also indicate error handling operations or actions that should be performed when an error occurs while using the public keys 221 and 223. For instance, the signed data object 251 may include a plurality of rules that correspond to a plurality of potential errors associated with the public keys 221 and 223 and/or the digital certificate 231. The error handling actions may also include error handling actions for the signed data object itself (e.g., the actual signature on the signed data object). The set of policies may further indicate types of operations and/or applications that are allowed to use (or should use which of) the public keys 221 and 223.

In one embodiment, the signed data objects 251 and 252 may each include a set of identifiers. For example, the signed data object 251 may include one or more object identifiers (OIDs), alphanumeric strings, numbers, etc. One or more identifiers of the signed data object 251 may be unique. For example, one or more identifiers may be globally unique, or may be unique to the environment where the signed data object 251 is used. The set of identifiers may identify various devices, applications, entities, etc. For example, the signed data object 252 may include identifiers for the first device 210 and the second device 220. In another example, the signed data object 251 may include identifiers for applications (e.g., software applications) which use the signed data object 251. In another example, the signed data object 251 may include identifiers for the certificate distribution process 230. These identifiers may indicate that applicability of the key management policies included in a signed data object.

In one embodiment, the signed data object 251 may include a set of timestamps (e.g., Time Stamp Tokens (TST)). The time stamps may be used to, but not limited to, validate when a signed data object was created, validate when the signed data object was deployed, validate expirations that may exist within the signed data object, etc. The time stamps may also be used, for example, to identify incidents during pre-processing such as certificate installation, real-time processing within a security protocol, or post-processing such as an audit or incident investigation for which the signed data object is applicable.

As discussed above, errors may occur during pre-processing, real-time processing, and post-processing. As part of the errors, a key of a digital certificate may be used incorrectly which may result in an encryption or decryption process to fail, leading to possibly complicated and time-consuming revision to the key and the key pair associated to the key.

In one embodiment, the signed data objects 251 and 252 may each be associated with multiple certificates. For example, signed data object 251 may include policies, identifiers, and/or timestamps for multiple digital certificates, which may include, but not limited to, unique global identifiers, timestamps for the digital certificates, and instructions indicating specific usage of digital certificates along with multiple keys included therein.

Although a high-level explanation of the operations of example embodiments has been provided above, specific details regarding the configuration of such example embodiments are provided below.

System Architecture

Figure 3:
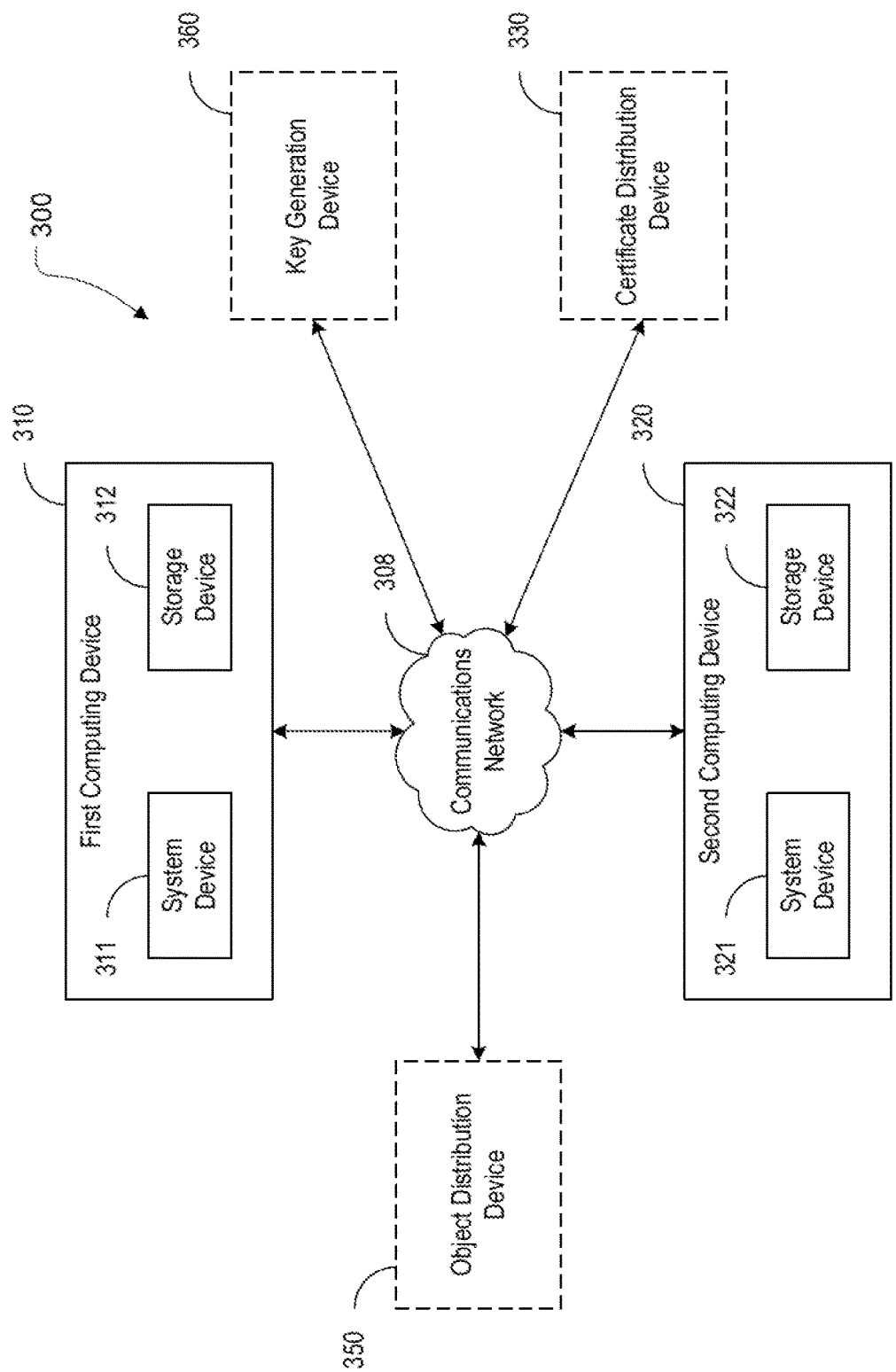
FIG. 3 illustrates an environment in which some example embodiments may be used.

FIG. 3 illustrates environment 300 in which some example embodiments may be used. Example embodiments described herein may be implemented using any of a variety of computing devices or servers. To this end, FIG. 3 illustrates an example environment 300 (or system) within which various embodiments may operate. As illustrated, the environment 300 may include a first computing device 310 which may include a system device 311 in communication with a storage device 312. The environment 300 may also include other computing devices, such as a second computing device 320, which may also include a system device 321 in communication with a storage device 322. Although system devices 311 and 321 and storage devices 312 and 322 are described in singular form, computing devices in some embodiments may utilize more than one system device and/or more than one storage device. Additionally, in some embodiments, the computing devices 310 and 320 may not require a storage device at all. Whatever the implementation, the first and second computing devices 310 and 320, and their constituent system device(s) 311 and 321 and/or storage device(s) 312 and 322 may receive and/or transmit information via communications network 308 (e.g., the Internet) with any number of other devices, such as one or more additional computing devices (not shown), a key generation device 360, and/or a certificate distribution device 330.

System devices 311 and 321 may be implemented as one or more servers, which may or may not be physically proximate to other components of their respective computing devices (e.g., first computing device 310 and second computing device 320). Furthermore, some components of system devices 311 and 321 may be physically proximate to the other components of their respective computing devices while other components are not. System devices 311 and 321 may receive, process, generate, and transmit data, signals, and electronic information to facilitate the operations of first computing device 310 and second computing device 320. Particular components of system devices 311 and 321 are described in greater detail below with reference to apparatus 400 in connection with FIG. 4.

Storage devices 312 and 322 may comprise distinct components from system devices 311 and 321, or may comprise an element of system devices 311 and 321 (e.g., memory 404, as described below in connection with FIG. 4). Storage devices 312 and 322 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 308). Storage devices 312 and 322 may host the software executed to operate the first computing device 310 and second computing device 320, respectively. Storage devices 312 and 322 may store information relied upon during operation of the first and second computing devices 310 and 320, such as various sets of seed bits, key derivation functions, keys, certificates, and/or other information that may be used by the first and second computing devices 310 and 320, data and documents to be analyzed using the first and second computing devices 310 and 320, or the like. In addition, storage devices 312 and 322 may store control signals, device characteristics, and access credentials enabling interaction between the first computing device 310 and second computing device 320 and one or more of object distribution device 350, key generation device 360, and certificate distribution device 330.

The key generation device 360 may be embodied by various computing devices known in the art. The key generation device 360 may be capable of generating one or more keys (e.g., public keys, private keys, etc.). As discussed above, the one or more keys may be included in certificates and/or may be used to perform various cryptographic functions/actions (e.g., cryptographic data protection actions). The key generation device 360 may generate one or more keys based on seed bits (e.g., bits of data, a pseudo-random or truly random number, a non-determinative number, etc.). For example, the key generation device 360 may comprise random number generator circuitry, which may comprise a pseudo-random number generator (PRNG) or, in some embodiments, a quantum random number generator (QRNG), that may be used to generate the one or more keys. Although the key generation device 360 is illustrated as being separate from the first computing device 310 and the second computing device 320, the key generation device 360 may be part of one or more of the first computing device 310 and the second computing device 320 in other embodiments.

The object distribution device 350 may be embodied by various computing devices known in the art. The object distribution device 350 may be capable of generating and/or obtaining through other means one or more signed data objects which may include key management policies for keys used by various computing devices (e.g., the first computing device 310 and the second computing device 320) and/or other information as discussed herein. In some embodiments, the object distribution device 350 may sign (e.g., add a signature to) data objects to generate the signed data objects. For example, the object distribution device 350 may sign a data object using a private key to generate a signed data object. In other embodiments, the object distribution device 350 may provide the data objects to another device/entity which may sign the data objects to generate the signed data objects. Although the object distribution device 350 is illustrated as being separate from the first computing device 310 and the second computing device 320, the object distribution device 350 may be part of one or more of the first computing device 310 and the second computing device 320 in other embodiments. The object distribution device 350 may also perform actions, operations, functions, etc., of the object distribution process 250 illustrated in FIG. 2.

The certificate distribution device 330 may be embodied by various computing devices known in the art. The certificate distribution device 330 may be capable of generating one or more digital certificates, such a X.509 certificates. The digital certificates may include public keys for the first computing device 310 and/or the second computing device 320. The digital certificates may be signed by the certificate distribution device 330. The signature (e.g., digital signature) in a digital certificate may allow devices, users, entities, etc., to verify the identity of users and/or devices. Although the certificate distribution device 330 is illustrated as being separate from the first computing device 310 and the second computing device 320, the certificate distribution device 330 may be part of one or more of the first computing device 310 and the second computing device 320 in other embodiments. The certificate distribution device 330 may also perform actions, operations, functions, etc., of the certificate distribution process 230 illustrated in FIG. 2. For example, the certificate distribution device 330 may be a certificate authority or may be part of or otherwise associated with a certificate authority.

The first computing device 310 and second computing device 320 may be embodied by any computing devices known in the art, such as desktop or laptop computers, tablet devices, smartphones, server devices (e.g., a secure data center or other device hosted within the secure network infrastructure of an organization or entity), Automated Teller Machines (ATMs), point-of-sale (POS) devices, or the like. Moreover, the first computing device 310 and second computing device 320 need not themselves be independent devices, but may be peripheral devices communicatively coupled to other computing devices.

Example Implementing Apparatuses

Figure 4:
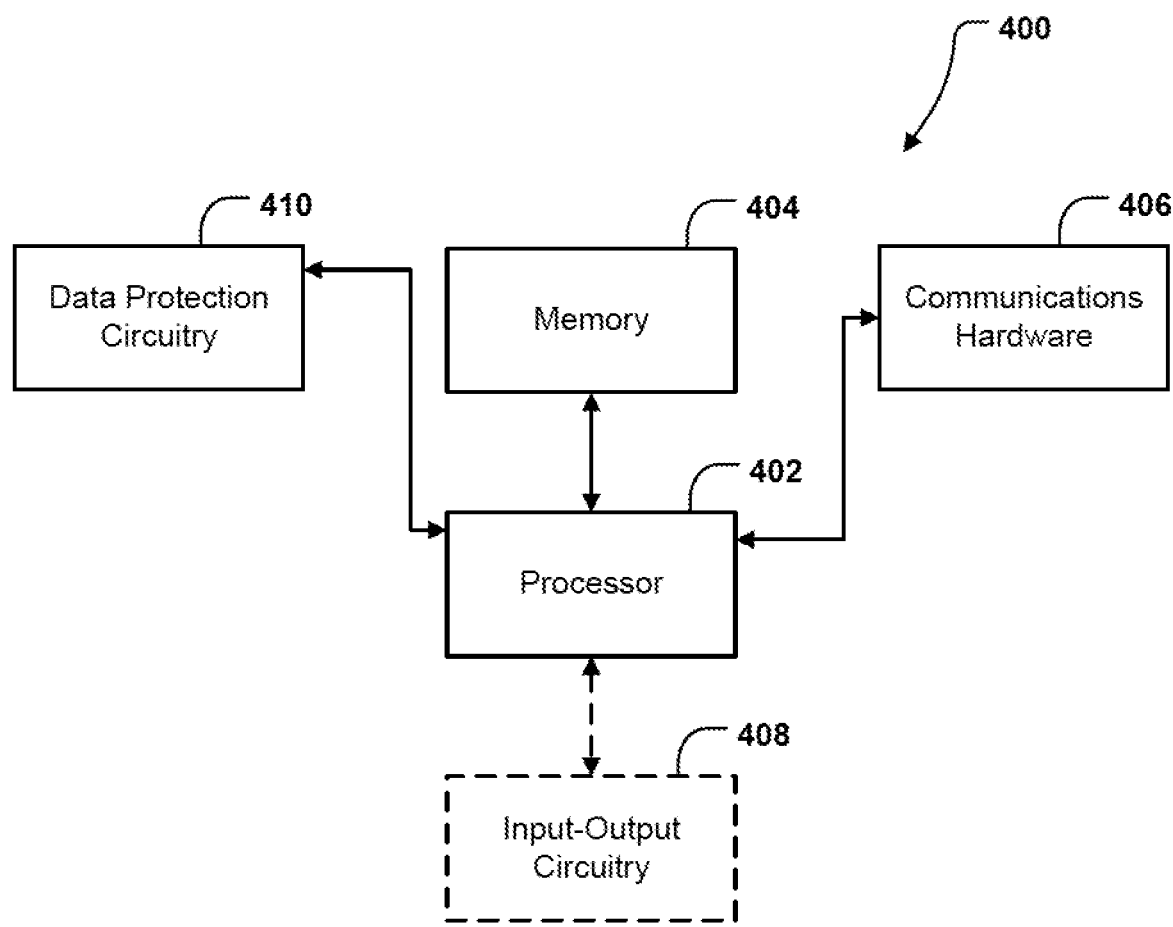
FIG. 4 illustrates a schematic block diagram of example circuitry embodying an apparatus that may perform various operations in accordance with some example embodiments described herein.

FIG. 4 illustrates a schematic block diagram of example circuitry embodying an apparatus 400 (e.g., a device) that may perform various operations in accordance with some example embodiments described herein. Apparatus 400 may represent an example of the system device 311 of the first computing device 310 and/or the system device 321 of the second computing device 320 (described previously with reference to FIG. 3) may each be embodied by one or more computing devices or servers. As illustrated in FIG. 4, the apparatus 400 may include processor 402, memory 404, communications hardware 406, an optional input-output circuitry 408, and data protection circuitry 410, each of which will be described in greater detail below. While the various components are only illustrated in FIG. 4 as being connected with processor 402, it will be understood that the apparatus 400 may further comprises a bus (not expressly shown in FIG. 4) for passing information amongst any combination of the various components of the apparatus 400. The apparatus 400 may be configured to execute various operations described above in connection with FIGS. 2-3 and below in connection with FIGS. 8 and 9.

The processor 402 (and/or co-processor or any other processor assisting or otherwise associated with the processor) may be in communication with the memory 404 via a bus for passing information amongst components of the apparatus. The processor 402 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 400, remote or "cloud" processors, or any combination thereof.

The processor 402 may be configured to execute software instructions stored in the memory 404 or otherwise accessible to the processor (e.g., software instructions stored on a separate storage device (e.g., storage device 312 and/or storage device 322), as illustrated in FIG. 1). In some cases, the processor may be configured to execute hard-coded functionality. As such, whether configured by hardware or software methods, or by a combination of hardware with software, the processor 402 represent an entity (e.g., physically embodied in circuitry) capable of performing operations according to various embodiments of the present invention while configured accordingly. Alternatively, as another example, when the processor 402 is embodied as an executor of software instructions, the software instructions may specifically configure the processor 402 to perform the algorithms and/or operations described herein when the software instructions are executed.

Memory 404 is non-transitory and may include, for example, one or more volatile and/or non-volatile memories. In other words, for example, the memory 404 may be an electronic storage device (e.g., a computer readable storage medium). The memory 404 may be configured to store information, data, content, applications, software instructions, or the like, for enabling the apparatus to carry out various functions in accordance with example embodiments contemplated herein.

The communications hardware 406 may be any means such as a device or circuitry embodied in either hardware or a combination of hardware and software that is configured to receive and/or transmit data from/to a network and/or any other device, circuitry, or module in communication with the apparatus 400. In this regard, the communications hardware 406 may include, for example, a network interface for enabling communications with a wired or wireless communication network. For example, the communications hardware 406 may include one or more network interface cards, antennas, buses, switches, routers, modems, and supporting hardware and/or software, or any other device suitable for enabling communications via a network. Furthermore, the communications hardware 406 may include the processor for causing transmission of such signals to a network or for handling receipt of signals received from a network. In some embodiments, the communications hardware 406 may include, for example, interfaces such as one or more ports (e.g., a laser port, a fiber-optic cable port, and/or the like) for enabling communications with other devices.

The apparatus 400 may include input-output circuitry 408 configured to provide output to a user and, in some embodiments, to receive an indication of user input. It will be noted that some embodiments will not include input-output circuitry 408, in which case user input may be received via a separate device such as a separate client device or the like. The input-output circuitry 408 may comprise a user interface, such as a display, and may further comprise the components that govern use of the user interface, such as a web browser, mobile application, dedicated client device, or the like. In some embodiments, the input-output circuitry 408 may include a keyboard, a mouse, a touch screen, touch areas, soft keys, a microphone, a speaker, and/or other input/output mechanisms. The input-output circuitry 408 may utilize the processor 402 to control one or more functions of one or more of these user interface elements through software instructions (e.g., application software and/or system software, such as firmware) stored on a memory (e.g., memory 404) accessible to the processor 402.

In addition, the apparatus 400 further comprises data protection circuitry 410 that performs cryptographic data protection actions such as using public and/or private keys (e.g., asymmetric keys) to encrypt and/or decrypt data, verify digital signatures, and/or other cryptographic data protection actions. The data protection circuitry 410 also processes signed data objects such that the data protection circuitry 410 may address the ambiguity between when and how public keys and signatures of certificates are to be used to secure communications. In this regard, the data protection circuitry 410 may leverage a received signed data object to make various determinations, such as which public key (from a plurality of public keys) to select to verify a particular digital signature of a certificate. The data protection circuitry 410 may also perform other operations permitting use of various cryptographic protocols, such as encryption, decryption, certificate and/or digital signature verification. The data protection circuitry 410 may utilize processor 402, memory 404, or any other hardware component included in the apparatus 400 to perform these operations, as described in connection with FIGS. 8 and 9 below. The data protection circuitry 410 may further utilize communications hardware 406 to gather data from a variety of sources (e.g., other computing devices such as the first computing device 310 or the second computing device 320, object distribution device 350, key generation device 360, and/or certificate distribution device 330, as shown in FIG. 3), may utilize input-output circuitry 408 to receive data from a user, and in some embodiments may utilize processor 402 and/or memory 404 to process a signed data object and/or encrypt data using a symmetric key, decrypt encrypted data using a symmetric key, generate a message authentication code using a symmetric key, and/or perform other cryptographic data protection actions.

Although components 402-410 are described in part using functional language, it will be understood that the particular implementations necessarily include the use of particular hardware. It should also be understood that certain of these components 402-410 may include similar or common hardware. For example, data protection circuitry 410, may at times leverage use of the processor 402, memory 404, communications hardware 406, or input-output circuitry 408, such that duplicate hardware is not required to facilitate operation of these physical elements of the apparatus 400 (although dedicated hardware elements may be used for any of these components in some embodiments, such as those in which enhanced parallelism may be desired). Use of the terms "circuitry," and "generator" with respect to elements of the apparatus therefore shall be interpreted as necessarily including the particular hardware configured to perform the functions associated with the particular element being described. Of course, while the terms "circuitry" and "generator" should be understood broadly to include hardware, in some embodiments, the terms "circuitry" and "generator" may in addition refer to software instructions that configure the hardware components of the apparatus 400 to perform the various functions described herein.

Although data protection circuitry 410 may leverage processor 402, memory 404, communications hardware 406, or input-output circuitry 408 as described above, it will be understood that any of these elements of apparatus 400 may include one or more dedicated processor, specially configured field programmable gate array (FPGA), or application specific interface circuit (ASIC) to perform its corresponding functions, and may accordingly leverage processor 402 executing software stored in a memory (e.g., memory 404), or memory 404, communications hardware 406 or input-output circuitry 408 for enabling any functions not performed by special-purpose hardware elements. In all embodiments, however, it will be understood that the data protection circuitry 410 may be implemented via particular machinery designed for performing the functions described herein in connection with such elements of apparatus 400.

Figure 5:
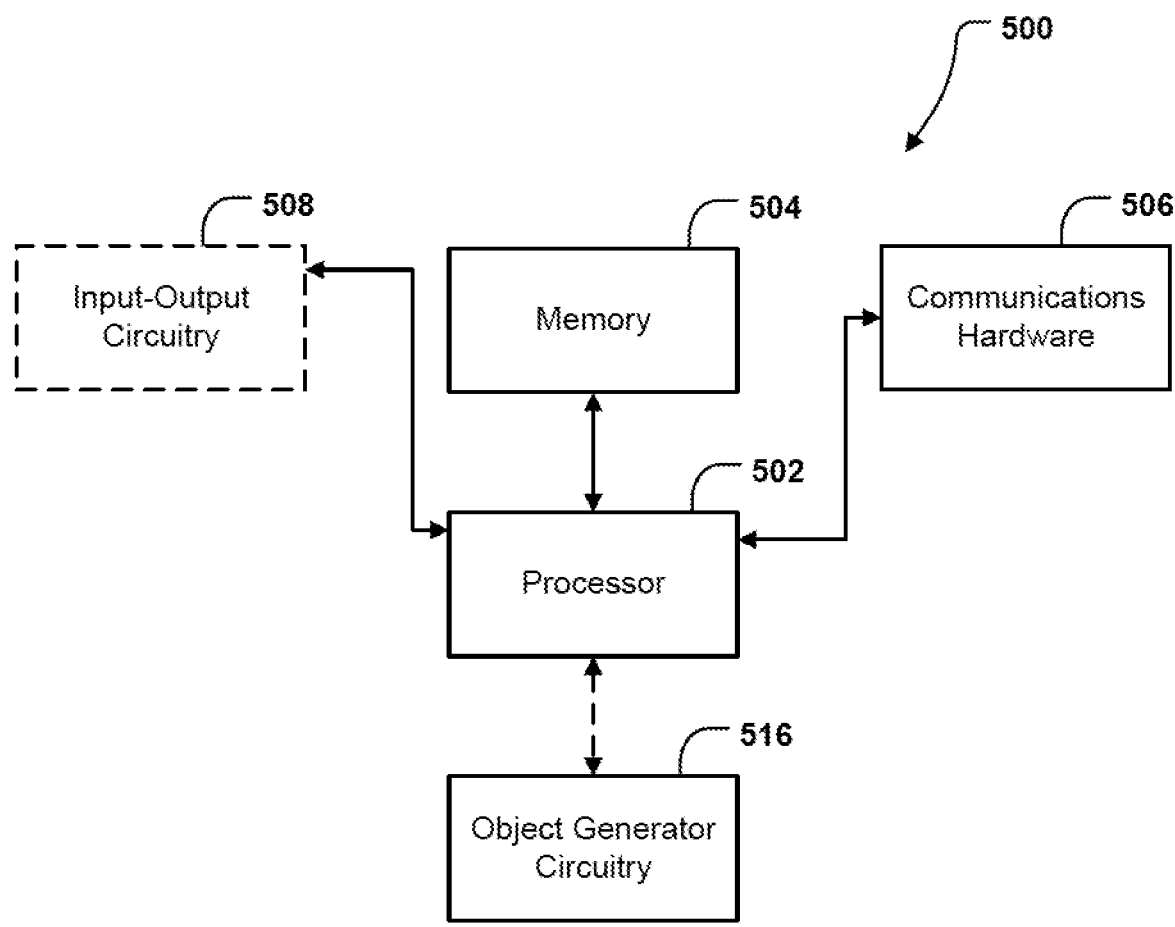
FIG. 5 illustrates a schematic block diagram of example circuitry embodying a device that may perform various operations in accordance with some example embodiments described herein.

FIG. 5 illustrates a schematic block diagram of example circuitry embodying an apparatus 500 (e.g., a device) that may perform various operations in accordance with some example embodiments described herein. The apparatus 500 illustrated in FIG. 5 may represent an example object distribution device 350. The apparatus 500 includes processor 502, memory 504, communications hardware 506, and may optionally include input-output circuitry 508, each of which is configured to be similar to the similarly named components described above in connection with FIG. 4.

The apparatus 500 also includes object generator circuitry 516. The object generator circuitry 516 may generate data objects and/or signed data objects (e.g., signed data objects 251 and 252 illustrated in FIG. 2). For example, the object generator circuitry 516 may generate a data object and also sign the data object (e.g., add a digital signature to the data object). In another example, the object generator circuitry 516 may generate the data object and the data object may be provided to another device (e.g., a certificate authority) for signing. The data objects may also be digital certificates in optional embodiments.

As discussed above, a data object or signed data object may include a set of policies (e.g., one or more rules, parameters, procedures, etc.) for various keys (e.g., public keys). The set of policies may indicate one or more periods of times when the keys should be used, may indicate error handling operations, and/or may indicate types of operations and/or applications that are allowed to use the keys. A data object or signed data object may also include one or more identifiers (e.g., OIDs). The identifiers may identify various devices, applications, entities, etc. A data object or signed data object may also include one or more timestamps (e.g., timestamp tokens).

Although components 502-516 are described in part using functional language, it will be understood that the particular implementations necessarily include the use of particular hardware. It should also be understood that certain of these components 502-516 may include similar or common hardware. For example, object generator circuitry 516, may at times leverage use of the processor 502, memory 504, communications hardware 506, or input-output circuitry 508, such that duplicate hardware is not required to facilitate operation of these physical elements of the apparatus 500 (although dedicated hardware elements may be used for any of these components in some embodiments, such as those in which enhanced parallelism may be desired). Use of the terms "circuitry," and "generator" with respect to elements of the apparatus therefore shall be interpreted as necessarily including the particular hardware configured to perform the functions associated with the particular element being described. Of course, while the terms "circuitry" and "generator" should be understood broadly to include hardware, in some embodiments, the terms "circuitry" and "generator" may in addition refer to software instructions that configure the hardware components of the apparatus 500 to perform the various functions described herein.

Although object generator circuitry 516 may leverage processor 502, memory 504, communications hardware 506, or input-output circuitry 508 as described above, it will be understood that any of these elements of apparatus 500 may include one or more dedicated processor, specially configured field programmable gate array (FPGA), or application specific interface circuit (ASIC) to perform its corresponding functions, and may accordingly leverage processor 402 executing software stored in a memory (e.g., memory 504), or memory 504, communications hardware 506 or input-output circuitry 508 for enabling any functions not performed by special-purpose hardware elements. In all embodiments, however, it will be understood that the object generator circuitry 516 may be implemented via particular machinery designed for performing the functions described herein in connection with such elements of apparatus 500.

Figure 6:
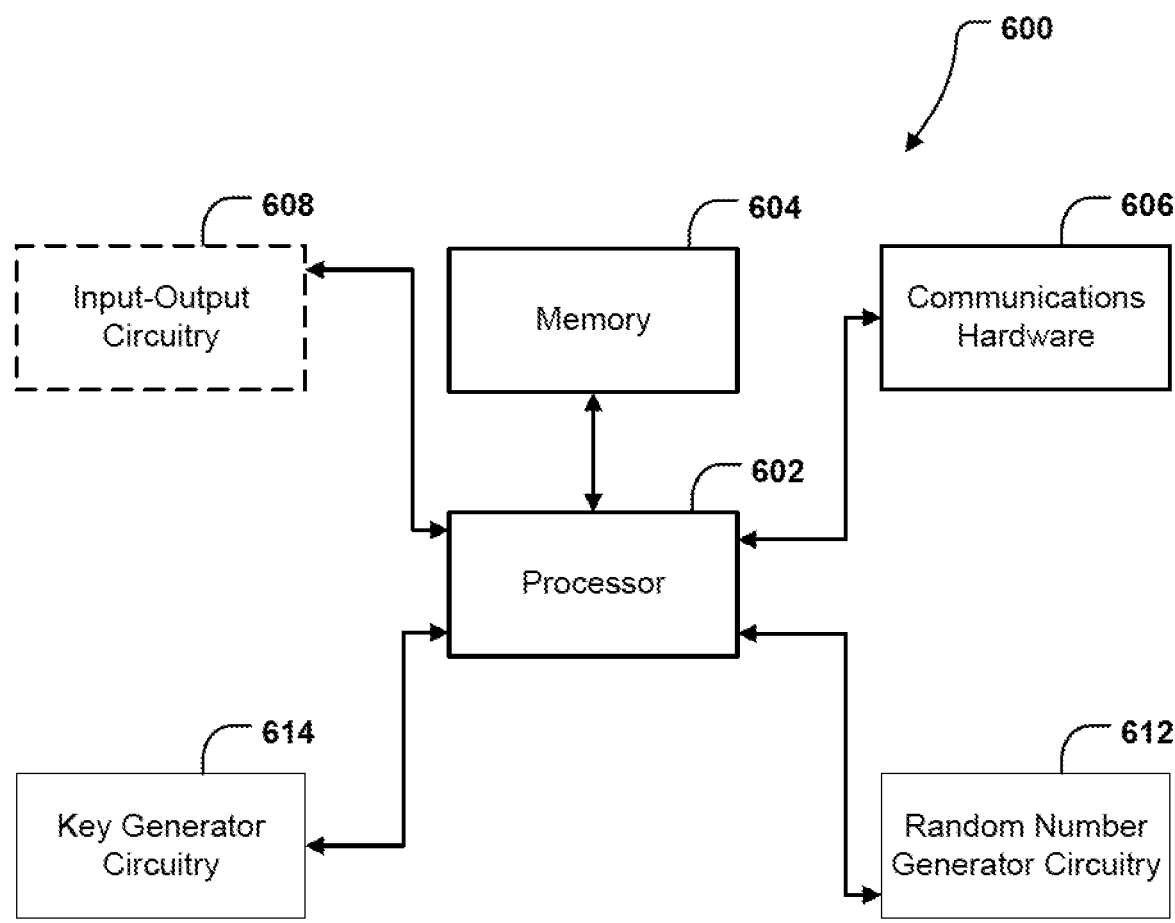
FIG. 6 illustrates a schematic block diagram of example circuitry embodying a device that may perform various operations in accordance with some example embodiments described herein.

FIG. 6 illustrates a schematic block diagram of example circuitry embodying an apparatus 600 (e.g., a device) that may perform various operations in accordance with some example embodiments described herein. The apparatus 600 illustrated in FIG. 6 may represent an example key generation device 360. The apparatus 600 includes processor 602, memory 604, communications hardware 606, and may optionally include input-output circuitry 608, each of which is configured to be similar to the similarly named components described above in connection with FIG. 4.

In some embodiments, the apparatus 600 may comprise random number generator circuitry 612 that generates random numbers. For example, the random number generator circuitry 612 may comprise one or more of a PRNG and a QRNG. The random number generator circuitry 612 may utilize processor 602, memory 604, or any other hardware component included in the apparatus 600 to perform these operations, as described in connection with FIGS. 8 and 9 below. The random number generator circuitry 612 may further utilize communications hardware 606 to gather data from a variety of sources (e.g., computing devices such as the first computing device 310 or the second computing device 320, as shown in FIG. 3), may utilize input-output circuitry 608 to receive data from a user, and in some embodiments may utilize processor 602 and/or memory 604 to generate the random numbers. The key generator circuitry 614 may be any means such as one or more devices or circuitry embodied in either hardware or a combination of hardware and software that is configured to measure entangled particles and generate keys. The entangled particles may be measured to obtain a key (e.g., in the form of a sequence of true random numbers).

In some embodiments, the apparatus 600 may also comprise a key generator circuitry 614 that generates one or more keys. For example, the key generator circuitry 614 may generate public keys, private keys, asymmetric keys, and optionally symmetric keys. The key generator circuitry 614 may generate keys based on random numbers (e.g., non-quantum based random numbers generated using a PRNG, quantum based random numbers generated using a QRNG, etc.) generated by the random number generator circuitry 612. The key generator circuitry 614 may utilize processor 602, memory 604, or any other hardware component included in the apparatus 600 to perform these operations, as described in connection with FIG. 8 below. The key generator circuitry 614 may further utilize communications hardware 606 to gather data from a variety of sources (e.g., storage device 312 or 322, as shown in FIG. 3), may utilize input-output circuitry 608 to receive data from a user, and in some embodiments may utilize processor 602 and/or memory 604 generate the one or more keys.

Although components 602-614 are described in part using functional language, it will be understood that the particular implementations necessarily include the use of particular hardware. It should also be understood that certain of these components 602-614 may include similar or common hardware. For example, random number generator circuitry 612 and key generator circuitry 614, may at times leverage use of the processor 602, memory 604, communications hardware 606, or input-output circuitry 608, such that duplicate hardware is not required to facilitate operation of these physical elements of the apparatus 600 (although dedicated hardware elements may be used for any of these components in some embodiments, such as those in which enhanced parallelism may be desired). Use of the terms "circuitry," and "generator" with respect to elements of the apparatus therefore shall be interpreted as necessarily including the particular hardware configured to perform the functions associated with the particular element being described. Of course, while the terms "circuitry" and "generator" should be understood broadly to include hardware, in some embodiments, the terms "circuitry" and "generator" may in addition refer to software instructions that configure the hardware components of the apparatus 600 to perform the various functions described herein.

Although random number generator circuitry 612, and key generator circuitry 614 may leverage processor 602, memory 604, communications hardware 606, or input-output circuitry 608 as described above, it will be understood that any of these elements of apparatus 600 may include one or more dedicated processor, specially configured field programmable gate array (FPGA), or application specific interface circuit (ASIC) to perform its corresponding functions, and may accordingly leverage processor 602 executing software stored in a memory (e.g., memory 604), or memory 604, communications hardware 606 or input-output circuitry 608 for enabling any functions not performed by special-purpose hardware elements. In all embodiments, however, it will be understood that the random number generator circuitry 612, and key generator circuitry 614 are implemented via particular machinery designed for performing the functions described herein in connection with such elements of apparatus 600.

Figure 7:
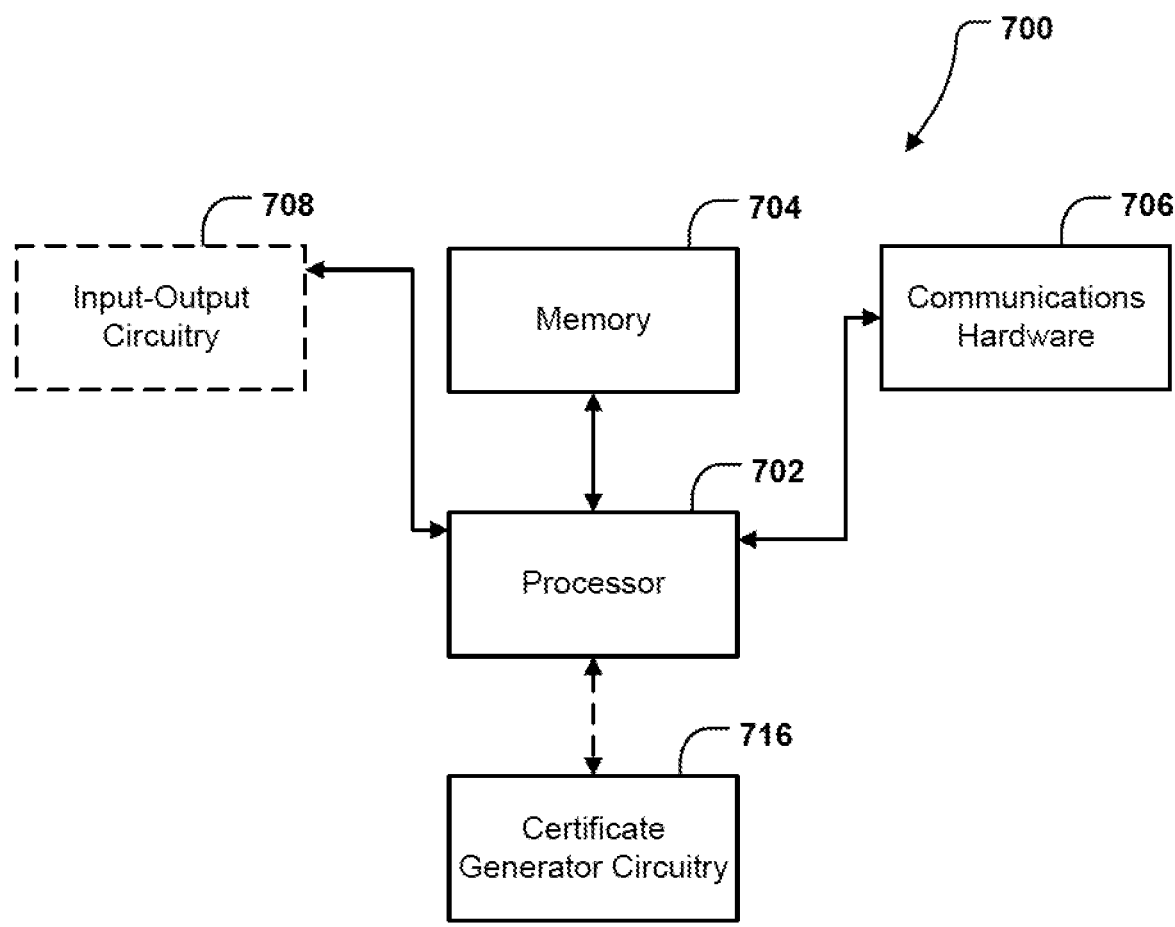
FIG. 7 illustrates a schematic block diagram of example circuitry embodying a device that may perform various operations in accordance with some example embodiments described herein.

FIG. 7 illustrates a schematic block diagram of example circuitry embodying an apparatus 700 (e.g., a device) that may perform various operations in accordance with some example embodiments described herein. The apparatus 700 illustrated in FIG. 7 may represent an example certificate distribution device 330. The apparatus 700 includes processor 702, memory 704, communications hardware 706, and may optionally include input-output circuitry 708, each of which is configured to be similar to the similarly named components described above in connection with FIG. 4.

The apparatus 700 also includes a certificate generator circuitry 716. The certificate generator circuitry 716 may generate certificates. For example, the certificate generator circuitry 716 may generate digital certificates, X.509 certificates, etc. The certificates may include one or more keys that may be used by devices, users, entities, etc. For example, a certificate may include multiple public keys, as discussed above. The certificate generator circuitry 716 may utilize processor 702, memory 704, or any other hardware component included in the apparatus 700 to perform these operations, as described in connection with FIG. 8 below. The certificate generator circuitry 716 may further utilize communications hardware 706 to gather data from a variety of sources (e.g., storage device 312 or 322, as shown in FIG. 3), may optionally utilize input-output circuitry 708 to receive data from a user, and in some embodiments may utilize processor 702 and/or memory 704 generate certificates.

In an embodiment, a device, such as first computing device 310, may receive one or more certificates from a certificate authority, such as certificate distribution device 330. For example, as cryptographic communication evolves to involve post-quantum cryptographic (PQC) keys, the first computing device 310 may receive a digital certificate including a PQC key and a legacy key (e.g., a non-PQC key). Without the ability to obtain (or otherwise have access to) a signed data object, the first computing device 310 may make a determination to utilize the digital certificate with the PQC key (e.g., verify a corresponding digital signature using the PQC key), while first computing device 310 may not have the processing capability to properly engage in post-quantum cryptography and therefore may not be able to utilize the PQC key to verify a corresponding digital signature. The ambiguity regarding the key pairs included in the digital certificate may result in this determination that may cause a failure to establish secure communication through use of different keys. By having the ability to obtain (or otherwise have access to) the signed data object, the first computing device 310 may receive the signed data object. The signed data object may be sent from an object distribution device 350. The received signed data object may include key management policies usable by the first computing device 310. The first computing device 310 may use the key management policies to determine, for example, whether a legacy key or a post-quantum key included in a certificate should be used (e.g., when verifying a digital signature). In some embodiments, the key management policies may indicate which of these to utilize on the basis of whether the first computing device 310 or another device supports the respective keys.

Although components 702-716 are described in part using functional language, it will be understood that the particular implementations necessarily include the use of particular hardware. It should also be understood that certain of these components 702-716 may include similar or common hardware. For example, certificate generator circuitry 716, may at times leverage use of the processor 702, memory 704, communications hardware 706, or input-output circuitry 708, such that duplicate hardware is not required to facilitate operation of these physical elements of the apparatus 700 (although dedicated hardware elements may be used for any of these components in some embodiments, such as those in which enhanced parallelism may be desired). Use of the terms "circuitry," and "generator" with respect to elements of the apparatus therefore shall be interpreted as necessarily including the particular hardware configured to perform the functions associated with the particular element being described. Of course, while the terms "circuitry" and "generator" should be understood broadly to include hardware, in some embodiments, the terms "circuitry" and "generator" may in addition refer to software instructions that configure the hardware components of the apparatus 700 to perform the various functions described herein.

Although certificate generator circuitry 716 may leverage processor 702, memory 704, communications hardware 706, or input-output circuitry 708 as described above, it will be understood that any of these elements of apparatus 700 may include one or more dedicated processor, specially configured field programmable gate array (FPGA), or application specific interface circuit (ASIC) to perform its corresponding functions, and may accordingly leverage processor 702 executing software stored in a memory (e.g., memory 704), or memory 704, communications hardware 706 or input-output circuitry 708 for enabling any functions not performed by special-purpose hardware elements. In all embodiments, however, it will be understood that the certificate generator circuitry 716 may be implemented via particular machinery designed for performing the functions described herein in connection with such elements of apparatus 700.

In some embodiments, various components of the apparatuses 400, 500, 600, and 700 may be hosted remotely (e.g., by one or more cloud servers) and thus need not physically reside on the corresponding apparatus 400, 500, 600, and 700. Thus, some or all of the functionality described herein may be provided by third party circuitry. For example, a given apparatus 400, 500, 600, and 700 may access one or more third party circuitries via any sort of networked connection that facilitates transmission of data and electronic information between the apparatus 400, 500, 600, and 700 and the third-party circuitries. In turn, that apparatus 400, 500, 600, and 700 may be in remote communication with one or more of the other components describe above as comprising the apparatus 400, 500, 600, and 700.

As will be appreciated based on this disclosure, example embodiments contemplated herein may be implemented by apparatuses 400, 500, 600, and 700. Furthermore, some example embodiments may take the form of a computer program product comprising software instructions stored on at least one non-transitory computer-readable storage medium (e.g., memory 404). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 400 as described in FIG. 4, apparatus 500 as described in FIG. 5, apparatus 600 as described in FIG. 6, or apparatus 700 as described in FIG. 7 that loading the software instructions onto a computing device or apparatus produces a special-purpose machine comprising the means for implementing various functions described herein.

Having described specific components of example apparatuses 400 and 500, example embodiments are described below in connection with a series of flowcharts.

Example Operations

Figure 8:
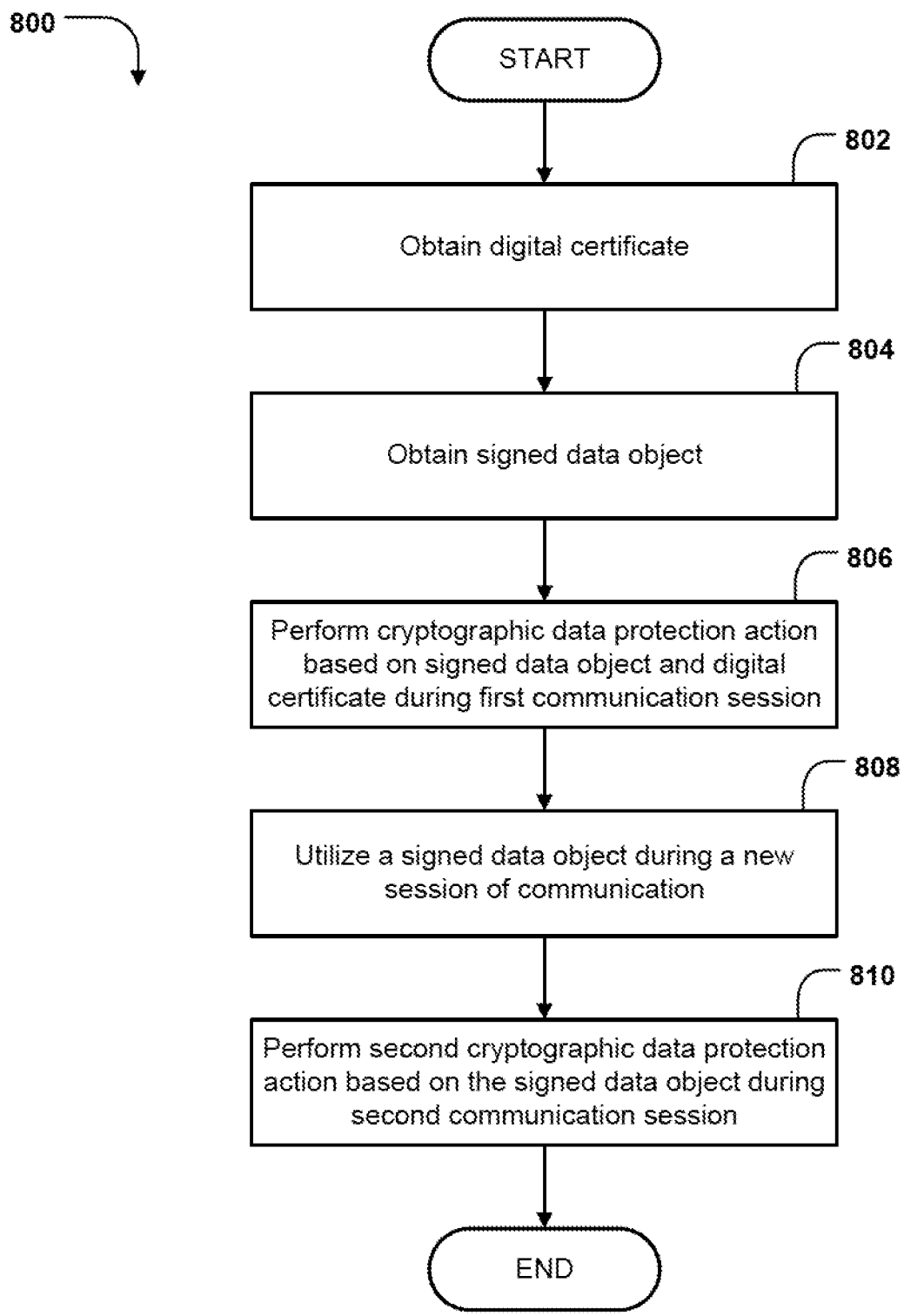
FIG. 8 illustrates an example flowchart for secure communication based on a digital certificate and a signed data object, in accordance with some example embodiments described herein.
Figure 9:
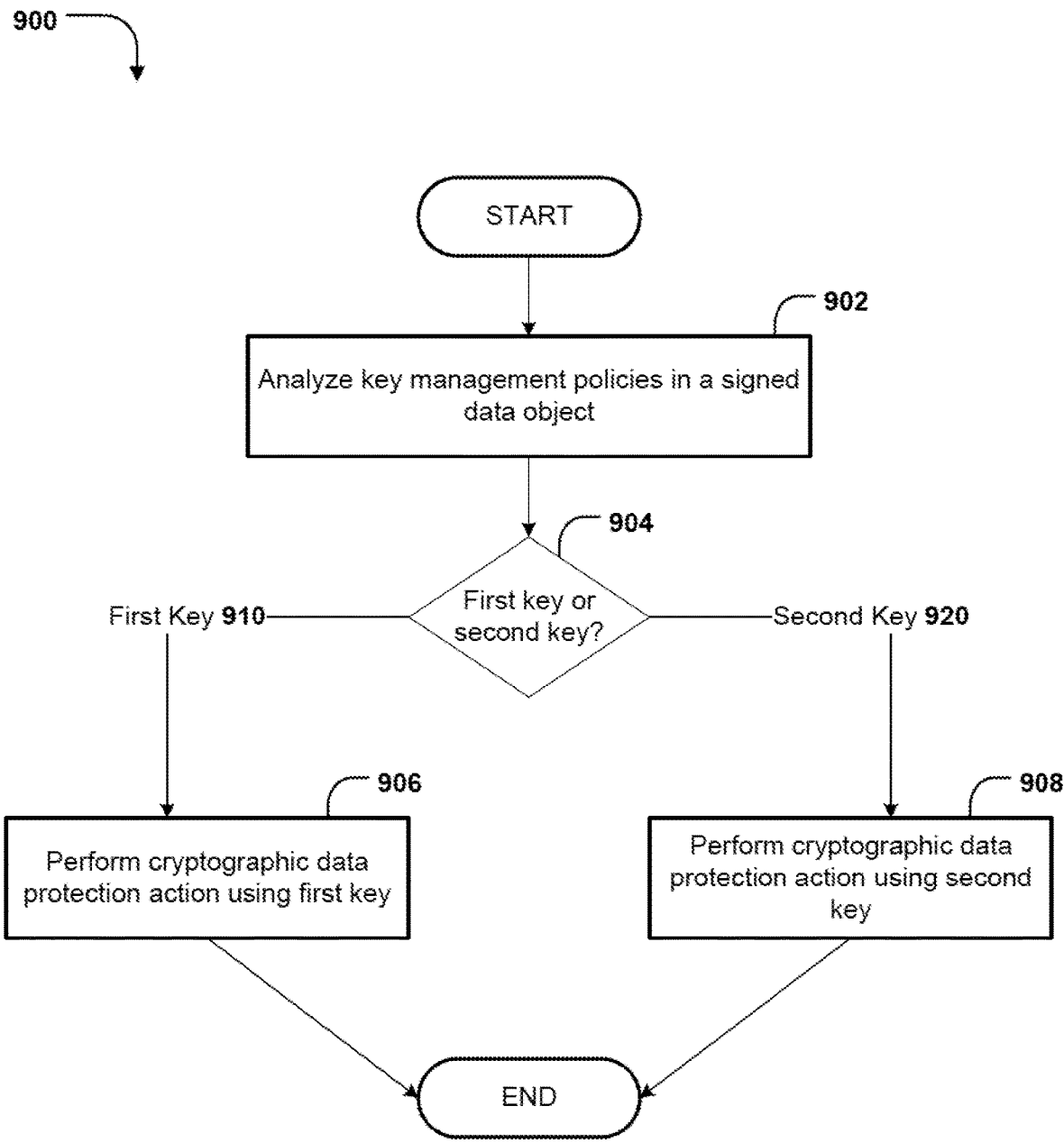
FIG. 9 illustrates an example flowchart for secure communication based on a digital certificate and a signed data object, in accordance with some example embodiments described herein.

Turning to FIGS. 8 and 9, example flowcharts are illustrated that include example operations implemented by example embodiments described herein. The operations illustrated in FIGS. 8 and 9 may, for example, may be performed by system device 311 of the first computing device 310 shown in FIG. 3, which may in turn be embodied by an apparatus 400 which is shown and described in connection with FIGS. 3-4. To perform the operations described below, the environment 300 and apparatus 400 may utilize one or more of communications network 308, first computing device 310, second computing device 320, certificate distribution device 330, object distribution device 350, key generation device 360, processor 402, memory 404, communications hardware 406, input-output circuitry 408, data protection circuitry 410, and/or any combination thereof.

It will be understood that user interaction with the first computing device 310 may occur directly via input-output circuitry 408, or may instead be facilitated by a separate client device or the like, and which may have similar or equivalent physical componentry facilitating such user interaction.

FIG. 8 illustrates an example flowchart 800 for performing one or more cryptographic data protection actions, in accordance with some example embodiments described herein. A digital certificate may be obtained in various ways.

As shown by operation 802, the apparatus 400 includes means, such as processor 402, memory 404, communications hardware 406, data protection circuitry 410, or the like, for obtaining a digital certificate. The digital certificate may be obtained by receiving the digital certificate from another entity as part of a certificate distribution process. The other entity may be, for example, certificate distribution device 330. As discussed above, the digital certificate may include one or more public keys (e.g., multiple public keys). The digital certificate may be received from another device (e.g., the other device that the apparatus 400 will communicate with,), a certificate authority, or from a trusted third party. For example, the computing device 310 may request or download a first digital certificate from a server computer, a blockchain, a certificate authority, etc. The first digital certificate may include a combination of PQC and non-PQC keys.

As shown by operation 804, the apparatus 400 includes means, such as processor 402, memory 404, communications hardware 406, data protection circuitry 410, or the like, for obtaining a signed data object. The signed data object may be obtained by receiving the signed data object from another entity as part of an object distribution process. The other entity may be, for example object distribution device 350. As discussed above, the signed data object may include one or more key management policies, one or more identifiers, one or more timestamps, etc.

Once the signed data object and the digital certificate have been obtained (e.g., have been received, downloaded, etc.), the first and second computing devices may then begin communicating with each other using the digital certificate and the signed data object. In this regard, as shown by operation 806, the apparatus 400 includes means, such as processor 402, memory 404, data protection circuitry 410, or the like, for performing a first cryptographic data protection action using the digital certificate and based on the signed data object. For instance, the first and second computing devices may begin securely communicating, in a first communication session, using the keys in the digital certificates and based on the key management policies in the signed data object.

In some embodiments, performing a cryptographic data protection action may comprise verifying a digital signature using a public key based on the set of key management policies indicated by the signed data object. In this regard, the apparatus 400 includes means, such as processor 402, memory 404, data protection circuitry 410, or the like, for verifying a first digital signature using a first public key or verifying a second digital signature using a second public key. For example, the signed data object may indicate for the devices to use the first public key and its corresponding digital signature (e.g., if one or more of the devices implement legacy, non-PQC protocols or the like, or may indicate for the devices to use the second public key and its corresponding digital signature (e.g., if the devices are capable of supporting PQC).

In some embodiments, performing a cryptographic data protection action may comprise encrypting data. In this regard, the apparatus 400 includes means, such as processor 402, memory 404, data protection circuitry 410, or the like, for encrypting data using one of the keys (e.g., public keys) in the digital certificate, based on one or more policies in the signed data object. For example, a first device 210 and second device 220 may attempt to securely communicate with each other. The first device 210 may obtain a digital certificate 231 including a public key 221 and a public key 223 through a certificate distribution process 230 from a device such as certificate distribution device 330. Public key 221 may be part of an asymmetric key pair; such that public key 221 may have a corresponding private key that may be private key 222. Similarly, second device 220 may obtain a digital certificate 232 including a public key 211 and public key 213 through a certificate distribution process 230 from a device such as certificate distribution device 330. Public key 211 may be part of an asymmetric key pair; such that public key 211 may have a corresponding private key that may be private key 212. In this example, the first device 210 and second device 220 may each obtain a signed data object that may have a policy indicating the use of the public keys to obtain a generated symmetric session key (e.g., a Diffie-Hellman Key Exchange process). The generated symmetric session key (e.g., one key used for encryption and decryption within a session of communication) may be generated by the first device 210 and the second device 220. These copies of the generated symmetric session key may be separately and simultaneously generated without sending the generated symmetric session key through an unsecure network. By doing so, the public and private keys may not be directly used for encryption or decryption, and the generated symmetric session key may be used directly for both encryption and decryption. This generated symmetric session key may then be used to encrypt data before a first device 210, or a second device 220, may send it to second device 220, or first device 210, respectively.

In some embodiments, performing a cryptographic data protection action may comprise decrypting data. In this regard, the apparatus 400 includes means, such as processor 402, memory 404, data protection circuitry 410, or the like, for decrypting encrypted data using a key. For example, as previously mentioned, the first device 210 may decrypt encrypted data (received from the second device 220) using the generated symmetric session key, based on public keys being shared between devices and according to policies included in the signed data object.

During a new communication session, a new generated symmetric session key may be generated to establish forward secrecy during the new communication session. As shown by operation 808, a signed data object may be utilized during a new communication session. The apparatus 400 includes means, such as processor 402, memory 404, communications hardware 406, data protection circuitry 410, or the like, for utilizing a signed data object to address the ambiguity of multiple public keys within digital certificates during a new communication session. The signed data object to address the ambiguity may be utilized by selecting one of multiple public keys based on the key management policies included in the signed data object. The one of the multiple public keys may be selected by reading the key management policies from the signed data object, collecting information specified by the key management policies, and using the collected information to discriminate one of the public keys from the others.

For example, as mentioned previously, the first communication session (e.g., during 806) may utilize the generated symmetric session key (e.g., during 804), which may be referred to as the first generate symmetric session key. During a new communication session between first device 210 and second device 220, the signed data object may be used to select a public key to use for generation of a second generated symmetric session key. The second generated symmetric session key may be generated utilizing a different public key from a certificate from the public key of the certificate used to generate the first generated symmetric session key used during the first communication session.

In an embodiment, the first device 210 and the second device 220 may begin a new communication session, and may use the second generated symmetric session key to secure the new communication session. The first device 210 and second device 220 may then begin communicating with each other using the second generated symmetric session key. In this regard, as shown by operation 810, the apparatus 400 includes means, such as processor 402, memory 404, data protection circuitry 410, or the like, for performing a second cryptographic data protection action using the second generated symmetric session key. The second cryptographic data protection action may be performed by encrypting and decrypting information exchanged during the new communication session. The information may be encrypted using the second generated symmetric session key by using the second generated symmetric session key as a cypher.

For instance, the first device 210 and second device 220 may begin securely communicating using the second generated symmetric session key in the new communication session by encrypting data using the second generate symmetric key before it is sent by either first device 210 or second device 220, and decrypting encrypted data using the second generated symmetric session key by either the first device 210 or second device 220.

FIG. 9 illustrates an example flowchart 900 for performing one or more cryptographic data protection actions, based on a signed data object's policies, identifiers, and/or timestamps, for addressing the ambiguity of multiple keys within digital certificates, in accordance with some example embodiments described herein.

As shown by operation 902, an analysis of key management policies in a signed data object may be performed. A data object may be analyzed in various ways, for example, the apparatus 400 includes means, such as processor 402, memory 404, communications hardware 406, data protection circuitry 410, or the like, for analysing key management policies in a signed data object. The key management policies may be analysed by (i) reading the key management policies to identify information on which a determination may be made, (ii) collecting the identified information, (iii) utilizing the collected information to identify which key of multiple public keys in a digital certificate to utilize during a future cryptographic data protection action.

As part of the analysis of the key management policies, timestamps and/or identifiers included within the signed data object may be utilized. The information from the signed data object may be used to select which public key of multiple public keys that could be utilized should be used to generate a session key or perform other types of cryptographic data protection actions, and which applications, protocols, etc., should be used with the public key to generate a session key.

As shown in FIG. 3, a first computing device 310 may obtain, over a communications network 308, a signed data object from an object distribution device 350. A digital certificate, received by first computing device 310 and received from a certificate distribution device 330, may include a first key 910 and a second key 920 (or other numbers of keys, but described here with respect to two keys merely for simplicity in description) along with corresponding digital signatures. The signed data object may include key management policies indicating how public keys (and corresponding digital signatures) within the digital certificates are to be managed. One of multiple public keys may be selected by reading the key management policies from the signed data object, collecting information specified by the key management policies, and using the collected information to discriminate one of the public keys from the others. The analysis may indicate, based on the key management policies within the signed data object, how a data protection circuitry 410 may manage multiple keys and digital signatures within digital certificates.

As shown by operation 904, the apparatus 400 includes means, such as processor 402, memory 404, communications hardware 406, data protection circuitry 410, or the like, for making a determination to use first key 910 or second key 920 (e.g., for a particular cryptographic data protection action). To make the determination, the key management policies for the multiple keys (and corresponding digital signatures) may be obtained from the signed data object previously mentioned in operation 902. The analysis of operation 902 may indicate which of the keys to utilize. The determination may be made using the outcome of the analysis of operation 902.

The determination may indicate that the first key 910 or the second key 920 is to be used (e.g., in a scenario where a certificate includes two keys and there is ambiguity in regard to which of the keys are to be used for cryptographic operations). If it is determined that first key 910 is to be used, then the method may proceed to operation 906. Otherwise, the method may proceed to operation 908 following operation 904. Similar processes may be used to resolve ambiguity regarding larger numbers of keys within digital certificates.

As shown by operation 906, the apparatus 400 includes means, such as processor 402, memory 404, communications hardware 406, data protection circuitry 410, or the like, to perform cryptographic data protection action using a first key 910. The cryptographic data protection action may be performed by using the first key 910 to secure communications. The communications may be secured by deriving a session key using the first key 910. The session key may be used as a cypher to encrypt communications during a communication session.

For example, based on the analysis previously mentioned in operation 904, the key management policies included in the signed data object indicate using a first key 910 (e.g., a PQC key) and corresponding digital signature for initial communication between the first computing device 310 and the second computing device 320, unless first key 910 is unable to be validated. First computing device 310 and second computing device 320 may both be capable of PQC and may have no issues when utilizing first key 910, which may result in first computing device 310 performing cryptographic data protection action using first key 910.

While the cryptographic data protection operation has been described with respect to obtaining a session key using first key 910, the cryptographic data protection operation may be other types of operations without departing from embodiments disclosed herein. For example, the cryptographic data protection operation may involve verifying a digital signature using a public key, as described above.

As shown by operation 908, the apparatus 400 includes means, such as processor 402, memory 404, communications hardware 406, data protection circuitry 410, or the like, to perform cryptographic data protection action using a second key 920. The cryptographic data protection action may be performed by using the second key 920 to secure communications. The communications may be secured by deriving a session key using the second key 920. The session key may be used as a cypher to encrypt communications during a communication session.

For example, based on the analysis previously mentioned in operation 904, the key management policies included in the signed data object indicate using a first key 910, a post-quantum key, for initial communication between the first computing device 310 and a second computing device 320, unless first key 910 may be unable to be validated, where second key 920 may be used in place of first key 910 instead. First computing device 310 may not be capable of post-quantum cryptography and may be unable to use first key 910, which may result in first computing device 310 performing cryptographic data protection action using second key 920.

While the cryptographic data protection operation has been described with respect to obtaining a session key using second key 920, the cryptographic data protection operation may be other types of operations without departing from embodiments disclosed herein.

As described above, example embodiments provide methods and apparatuses that enable secure communication based a set of public keys and corresponding digital signatures in digital certificates, and signed data objects that include policies for managing/using the set of public keys and their corresponding digital signatures. Example embodiments thus provide for a common method of utilizing a signed data object after which secure communication of sensitive data can be facilitated between all devices thereby resolving the ambiguity in which keys from a certificate to mutually use to secure communications or perform other types of cryptographic operations.

Example embodiments thus also provide methods for the capability to; roll-forward from legacy to PQC algorithms by using a signed data object and roll-backward from PQC to legacy algorithms by using a signed data object (e.g., in the event a digital signature cannot be validated using a public key due to one or more devices being unable to utilize PQC, another public key (e.g., associated with legacy (non-quantum) cryptography) and digital signature may be used), better manage digital certificates containing multiple keys (e.g., including verification of digital certificates), better manage digital certificates with information not contained in the digital certificates, allow for pre-processing such as certificate installation, real-time processing within a security protocol, and post-processing such as an audit or incident investigation. The example embodiments may do so by facilitate removal in ambiguity regarding key management policies of certificates, thereby providing for consistent use of certificates (and their associated public keys and corresponding digital signatures) across a distributed system.

FIGS. 8 and 9 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for secure communication, the method comprising:
   receiving, by communications hardware of a first device, a digital certificate comprising a first public key and a corresponding first digital signature and a second public key and a corresponding second digital signature;
   receiving, by the communications hardware of the first device, a signed data object that indicates a set of key management policies associated with the first public key and the second public key, wherein the signed data object comprises a second digital certificate; and
   performing, by data protection circuitry of the first device and based on the set of key management policies, a first cryptographic data protection action using the first public key and the first digital signature or the second public key and the second digital signature, wherein the first cryptographic data protection action facilitates secure communication between the first device and a second device.

2. The method of claim 1, wherein the first cryptographic data protection action comprises:
   verifying, by the data protection circuitry of the first device, the first digital signature using the first public key or verifying the second digital signature using the second public key.

3. The method of claim 1, wherein the set of key management policies indicate a period of time in which the first public key and the second public key are valid.

4. The method of claim 1, wherein the set of key management policies indicate one or more error handling actions for one or more of (i) the first public key and the second public key and (ii) the signed data object.

5. The method of claim 1, wherein the signed data object further indicates:
   (i) one or more types of operations that are allowed to use the first public key and the second public key; or
   (ii) one or more applications that are allowed to use the first public key and the second public key.

6. The method of claim 1, further comprising:
   verifying, by the data protection circuitry of the first device, a signature of the signed data object.

7. The method of claim 1, further comprising:
   receiving, by the communications hardware of the first device, a second signed data object that indicates a second set of key management policies associated with the first public key and the second public key; and
   performing, by the data protection circuitry of the first device and based on the second set of key management policies, a second cryptographic data protection action using the first public key and the first digital signature or the second public key and the second digital signature, wherein the second cryptographic data protection action facilitates secure communication between the first device and the second device.

8. The method of claim 1, wherein the signed data object is received from the second device or from a certificate authority.

9. The method of claim 1, wherein the signed data object comprises a set of identifiers for one or more of the first device, the second device, the first public key, the second public key, and an application.

10. The method of claim 1, wherein the signed data object comprises a set of timestamps for the set of key management policies.

11. The method of claim 1, wherein the first public key and the second public key comprise a combination of Post-Quantum Cryptography (PQC) keys and non-PQC keys.

12. The method of claim 1, wherein the digital certificate comprises one or more additional public keys and the set of key management policies are associated with the one or more additional public keys.

13. The method of claim 1, further comprising:
   making a determination, by the data protection circuitry and using the set of key management policies, to use the first public key or the second public key for the first cryptographic data protection action.

14. An apparatus for secure communication, the apparatus comprising a first device including:
   communications hardware configured to:
      receive a digital certificate comprising a first public key and a corresponding first digital signature and a second public key and a corresponding second digital signature, and
      receive a signed data object associated with the digital certificate wherein the signed data object indicates a set of key management policies for the first public key and the second public key, wherein the signed data object comprises a second digital certificate; and
   data protection circuitry configured to perform, based on the set of key management policies, a first cryptographic data protection action using the first public key and the first digital signature or the second public key and the second digital signature, wherein the first cryptographic data protection action facilitates secure communication between the first device and a second device.

15. The apparatus of claim 14, wherein the data protection circuitry performs the first cryptographic data protection action by: verifying the first digital signature using the first public key or verifying the second digital signature using the second public key.

16. The apparatus of claim 14, wherein the set of key management policies indicate a period of time in which the first public key and the second public key are valid.

17. The apparatus of claim 14, wherein the set of key management policies indicate one or more error handling actions for one or more of (i) the first public key and the second public key and (ii) the signed data object.

18. The apparatus of claim 14, wherein the signed data object further indicates:
   (i) one or more types of operations that are allowed to use the first public key and the second public key; or
   (ii) one or more applications that are allowed to use the first public key and the second public key.

19. The apparatus of claim 14, wherein the first public key and the second public key comprise a combination of Post-Quantum Cryptography (PQC) keys and non-PQC keys.

* * * * *